US008608954B2

(12) United States Patent
Jannot et al.

(10) Patent No.: US 8,608,954 B2
(45) Date of Patent: Dec. 17, 2013

(54) LIQUID TANK AND METHOD FOR MANUFACTURING IT

(75) Inventors: Frederic Jannot, Bousval (BE);
Barbara Mabed, Brussels (BE);
Jules-Joseph Van Schaftingen, Wavre (BE); Thomas Eltzer, Strasbourg (FR)

(73) Assignee: Inergy Automotive Systems Research (S.A.), Brussels (BE)

( * ) Notice: Subject to any disclaimer, the term of this patent is extended or adjusted under 35 U.S.C. 154(b) by 1102 days.

(21) Appl. No.: 12/299,399

(22) PCT Filed: May 14, 2007

(86) PCT No.: PCT/EP2007/054607
§ 371 (c)(1),
(2), (4) Date: Nov. 3, 2008

(87) PCT Pub. No.: WO2007/131974
PCT Pub. Date: Nov. 22, 2007

(65) Prior Publication Data
US 2009/0078627 A1  Mar. 26, 2009

(30) Foreign Application Priority Data

May 16, 2006  (FR) ...................................... 06 04357

(51) Int. Cl.
*B01D 35/01*  (2006.01)
(52) U.S. Cl.
USPC ........................................................ 210/120
(58) Field of Classification Search
USPC ................... 137/571–579, 38–46, 479–484, 137/583–592; 210/97–137; 123/510–521; 220/4.12–4.17
See application file for complete search history.

(56) References Cited

U.S. PATENT DOCUMENTS

| 3,633,609 | A |   | 1/1972  | Benner et al. |
| 3,915,184 | A |   | 10/1975 | Galles |
| 4,664,144 | A |   | 5/1987  | Lemmon |
| 4,951,699 | A | * | 8/1990  | Lipman ........................ 137/142 |
| 4,952,347 | A |   | 8/1990  | Kasugai |

(Continued)

FOREIGN PATENT DOCUMENTS

| DE | 19602818 A1 | 7/1997 |
| DE | 19607250 A1 | 8/1997 |

(Continued)

OTHER PUBLICATIONS

PCT International Search Report dated Jul. 5, 2007 for International Application No. PCT/EP2007/054607 (3 p.), 2007.

(Continued)

*Primary Examiner* — Duane Smith
*Assistant Examiner* — Thomas McKenzie
(74) *Attorney, Agent, or Firm* — Oblon, Spivak, McClelland, Maier & Neustadt, L.L.P.

(57) ABSTRACT

Liquid tank comprising:
  a first or storage volume for storing the liquid, bounded at least in part by a wall;
  a second or venting volume for venting the tank, bounded at least in part by the same wall;
  means of communication between the storage and venting volumes, situated in the top of these volumes;
  at least one orifice situated in the top of the venting volume, normally placing the venting volume in communication with a venting circuit; and
  means capable of closing off the means of communication, when the liquid in the venting volume reaches a predetermined level.

17 Claims, 2 Drawing Sheets

(56) References Cited

U.S. PATENT DOCUMENTS

Figure 1:
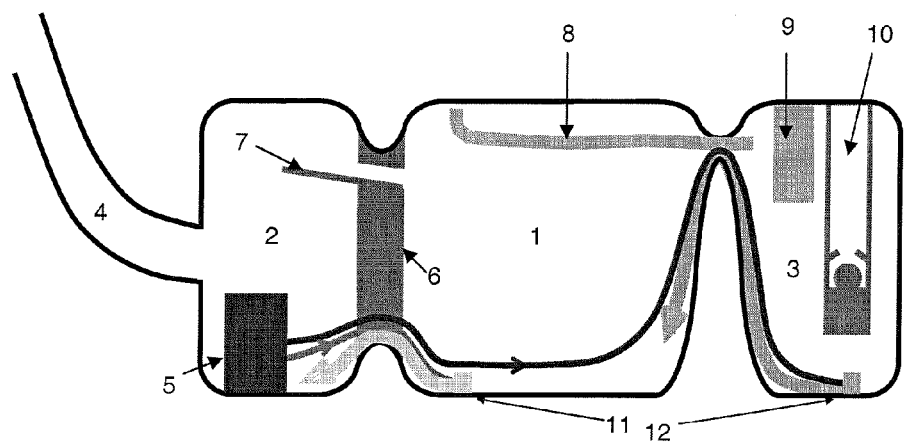

| | | | |
|---|---|---|---|
| 5,305,908 A | 4/1994 | Otto et al. | |
| 5,891,385 A | 4/1999 | Cerbelle et al. | |
| 2001/0015513 A1 | 8/2001 | Schaftingen et al. | |
| 2002/0148510 A1* | 10/2002 | Viebahn et al. | 137/574 |
| 2004/0216783 A1* | 11/2004 | Rumpf | 137/571 |
| 2004/0256006 A1 | 12/2004 | Aschoff et al. | |
| 2005/0178448 A1* | 8/2005 | Inoue | 137/571 |

FOREIGN PATENT DOCUMENTS

| | | |
|---|---|---|
| DE | 10227524 A1 | 1/2004 |
| EP | 0758579 A1 | 2/1997 |
| EP | 1110697 A2 | 6/2001 |
| EP | 1238845 A2 | 9/2002 |
| EP | 1418080 A1 | 5/2004 |
| FR | 2667583 A1 | 4/1992 |
| FR | 2679841 A1 | 2/1993 |
| GB | 1410215 | 10/1975 |
| GB | 649796 | 1/1981 |
| JP | 5-229015 A | 9/1993 |
| WO | WO0238409 A1 | 5/2002 |
| WO | WO 2004/007182 A1 | 1/2004 |
| WO | WO2004009391 A1 | 1/2004 |
| WO | WO2007026011 A1 | 3/2007 |

OTHER PUBLICATIONS

PCT International Preliminary Report dated Nov. 17, 2008 for International Application No. PCT/EP2007/054607 (6 p.), 2008.

Search Report dated Jan. 22, 2007 from Institut National De La Propriete Industrielle for French Application No. 06.04357 (2 p.), 2007.

U.S. Appl. No. 12/064,743, filed Feb. 25, 2008, Paul Plissart.

* cited by examiner

LIQUID TANK AND METHOD FOR MANUFACTURING IT

CROSS-REFERENCE TO RELATED APPLICATIONS

This application a U.S. national stage application under 35 U.S.C. §371 of International Application No. PCT/EP2007/054607, filed May 14, 2007, which claims priority to French Application No. 0604357, filed May 16, 2006, each of these applications being incorporated herein by reference for all purposes.

BACKGROUND OF THE INVENTION

The present invention relates to a liquid tank and, in particular, to a fuel tank with which a motor vehicle may be equipped. It also relates to a method for manufacturing this tank.

Liquid tanks, particularly fuel tanks for motor vehicles, are currently fitted, amongst other things, with a breather circuit. This circuit allows air to be introduced into the tank in the event of depression (in particular to compensate for the volume of liquid consumed) or gases contained in the tank to be removed in the event of overpressure (particularly if the contents warm up). This circuit also allows the gases that are to be discharged into the atmosphere to be routed and possibly filtered with a view to meeting the increasingly strict environmental requirements in this area.

The breather circuit comprises, in the known way, at least one value which as far as possible prevents liquid from the tank from leaving the tank if the tank is excessively inclined or rolls over. This breather valve needs to offer a rapid and reliable response when its operating conditions occur, but have minimal sensitivity to transient phenomena such as, in particular, very high flow rates, overpressures in the tank or low-amplitude waves. It also needs to ensure that a minimum amount of liquid is carried over into the canister (or the chamber containing a substance that adsorbs fuel vapours, usually active charcoal) in normal operation and during filling, otherwise the said canister would become saturated and the removal of contaminants from the gases discharged into the atmosphere would be ineffective. This phenomenon is generally termed LCO (for Liquid Carry-Over) in the jargon of the trade.

Many breather valves employ a float comprising an upper needle valve or ridge that closes off a connecting orifice between the tank and the breather circuit.

The disadvantage with this type of valve is its size and, in particular, its height, which limits the useful volume of the tank when positioned inside the latter. The problem is that the said valve lies at least partially above the maximum level for liquid in the tank, so that it can perform its function. However, it must be noted that a minimum head space known as an "expansion space" is nevertheless required by manufacturers and that, in general, the size and geometry of the valves are tailored accordingly.

Now, at the present time, motor manufacturers are seeking to increase accommodation, modularity and aerodynamics offered by the vehicles. A slim tank is an attractive alternative that allows the total height of the vehicle to be minimized while at the same time maximizing the head room inside the cabin and fitting perfectly under a flat floor.

However, reducing the height of the tank has the effect of limiting the size of the components inserted in it, particularly the ventilation valves because, in proportion, they limit the useful volume far more than they would in normal tanks. In reality, even the smallest float valves available on the market still take up too much of the useful height of slim tanks. In other words: the lost volume is far greater than the expansion volume required by motor manufacturers.

In order to solve this problem, recourse may be had to an expansion volume or chamber external to the tank, particularly as described in U.S. Pat. No. 3,915,184. However, such an architecture entails a separate part and lines of connection between the tank and this part, and this is complicated and expensive.

SUMMARY OF THE INVENTION

It is therefore an object of the present invention to supply a simpler and less expensive architecture that allows the useful volume of slim tanks to be increased while at the same time guaranteeing effective breathing and ventilation.

To this end, the present invention relates to a liquid tank comprising:
- a first volume for storing the liquid, bounded at least in part by a wall;
- a second volume for venting the tank, bounded at least in part by the same wall;
- means of communication between the storage and venting volumes, situated in the top of the said volumes;
- at least one orifice situated in the top of the venting volume, normally placing the said volume in communication with a venting circuit; and
- means capable of closing off the said communication when the liquid in the venting volume reaches a predetermined level.

An architecture such as this allows the storage volume to be filled as much as possible (and therefore allows the loss in useful volume to be minimized) while at the same time ensuring correct ventilation. It also makes it possible to reduce the number of valves, current architectures generally employing just one valve in each dome or part where gas pockets are liable to form (which in some cases may bring the number of valves required up to five). In some cases it also makes it possible to dispense with the noise (sloshing) reducing baffles, it being possible in some cases for the geometry of the various volumes to perform this function inherently.

The term "liquid tank" is intended to denote a sealed tank (or hollow body bounded by a wall), able to store a liquid under diverse and varying environmental and usage conditions. An example of this type of tank is a fuel tank fitted to motor vehicles. Another example of this type of tank is a storage tank for storing a solution of urea or a diesel additive, the stored liquid generally being intended to be fed to an exhaust gas post-treatment system, for example a particulate filter in the case of the diesel additive.

The liquid tank according to the invention is preferably made of plastic.

The term "plastic" is intended to denote any material comprising at least one synthetic resin polymer.

All types of plastic may be suitable. Particularly suitable plastics come from the thermoplastics category.

The term "thermoplastic" denotes any thermoplastic polymer, including thermoplastic elastomers, as well as blends thereof. The term "polymer" denotes both homopolymers and copolymers (especially binary or ternary copolymers). Examples of such copolymers are, non-limitingly: random copolymers, linear block copolymers, other block copolymers and graft copolymers.

Any type of thermoplastic polymer or copolymer whose melting point is below the decomposition temperature is suitable. Synthetic thermoplastics that have a melting range spread over at least 10° Celsius are particularly suitable. Examples of such materials include those that exhibit polydispersion in their molecular weight.

In particular, polyolefins, thermoplastic polyesters, polyketones, polyamides and copolymers thereof may be used. A blend of polymers or copolymers may also be used, as may a blend of polymer materials with inorganic, organic and/or natural fillers such as, for example, but non-limitingly, carbon, salts and other inorganic derivatives, natural fibres or polymeric fibres. It is also possible to use multilayer structures consisting of stacked layers bonded together comprising at least one of the polymers or copolymers described above.

One polymer which is often used is polyethylene. Excellent results have been obtained with high density polyethylene (HDPE).

The wall of the tank may consist of a single layer of thermoplastic or of two layers. One or more other possible additional layers may, advantageously, consist of layers of a material that forms a barrier against liquids and/or gasses. Preferably, the nature and the thickness of the barrier layer are chosen in such a way as to minimize the permeability to liquids and gasses in contact with the interior surface of the tank. This layer is preferably based on a barrier resin, that is to say on a resin impermeable to the fuel, such as EVOH (a copolymer of ethylene and partially hydrolysed vinyl acetate) for example. Alternatively, the tank may be subjected to a surface treatment (fluoration or sulphonation) the purpose of which is to render it impermeable to the fuel.

The tank according to the invention preferably comprises a barrier layer based on EVOH, situated between external layers based on HDPE.

The tank according to the invention is preferably moulded from a parison. A parison in fact is to be understood as meaning a plastic preform, generally extruded, which is intended to form the wall of the tank after it has been moulded to the required shape and size. In general, plastic fuel tanks are moulded by hot-forming flat sheets or by blow-moulding an extruded tubular parison, which does not necessarily have to be made in one piece.

The tank is preferably moulded by blow-moulding a parison made up of two separate parts, which may for example be two sheets. However, as a preference, these parts are the result of the cutting of a single extruded tubular parison as described in application EP 1 110 697 in the name of the Applicant Company, and the content of which is therefore introduced into the present application by reference.

In this variant, once a single parison has been extruded, this parison is cut along its entire length, along two diametrically opposed lines, to obtain two separate parts (sheets).

By comparison with the moulding of two separately extruded sheets, the thickness of which is constant, this approach makes it possible to use parisons of varying thickness (that is to say in which the thickness is not constant along their length), obtained using a suitable extruding device (generally an extruder equipped with a die and a punch, the position of which is adjustable). Such a parison takes account of the reduction in thickness that occurs during moulding at certain points on the parison, as a result of non-constant rates of deformation of the material in the mould.

Moulding the tank by definition entails recourse to a mould which generally comprises two cavities intended to be in contact with the external surface of the parison, the hot-forming or blow-moulding of the parison taking place by pressing the parison closely against these cavities by applying suction behind the cavities or by injecting a pressurised gas into the parison.

According to an advantageous variant of the invention, the mould also comprises a core insert. What that means is a part of appropriate shape and size that it can be inserted between the mould cavities and, in particular, be introduced into the parison while it is being moulded. A part such as this is, for example, described in Patent GB 1 410 215, the content of which is for that purpose incorporated into the present application by reference. This core insert may advantageously be used to fix one or more components to the parison (inside it) while it is actually being moulded. This variant makes it possible to avoid having to "pierce" the wall with openings in order to insert the said components inside the tank once the tank has been moulded. In the context of the invention, the core insert may advantageously serve to fix the means of communication between the storage and venting volumes, and the means of closing off the orifice for communicating with the venting circuit, when these are incorporated into the tank.

In this variant, the core insert may also be used to introduce the pressurized gas needed for blow-moulding the parison. Further, when the parison to be blow-moulded is in two parts, the core insert may also serve to keep the edges of these two parts (and the points where any internal welds may be produced) hot, at least during certain stages in the process (in general: the stages preceding the welding-together of the two parts to produce the tank).

Finally, the core insert may also be used at least partially for process control. For this, a camera may for example be incorporated into the core insert.

According to the invention, the storage and venting volumes are at least partially bounded by the same wall which is preferably the parison from which the tank is moulded. They therefore preferably have at least their top wall and their bottom wall made as a single piece (or, in other words: the top wall of the venting volume is in the continuation of the top wall of the storage volume, and the same is true of the bottom walls of these volumes). When the parison is in two parts, the volumes then generally have their top wall made in the same part of the parison, and their bottom wall made in the other part of the parison.

As a preference, the venting volume is markedly smaller than the storage volume. In general, the two volumes have the same height and therefore the venting volume preferably has a size which is reduced in the other dimensions in space.

The orifice present in the venting volume places this volume in communication with a venting circuit. When the tank according to the invention is a fuel tank, the venting circuit generally comprises a line connected to a canister (a casing containing active charcoal) or to any other device for filtering the fuel-laden gases before they are discharged into the atmosphere. The orifice for communication with this circuit advantageously forms part of a valve which may, aside from performing its aforementioned ventilation and venting functions, also perform other functions such as, for example, setting the maximum fill level (the FLVV or Fill Limit Venting Valve function), preventing the ingress of liquid in the event of a rolling-over or excessive slope (the ROV or Rollover valve function) and/or preventing overfilling (the ISR or Overfill Prevention function). Alternatively, the venting volume may comprise additional valves for performing these functions.

Advantageously, the predetermined liquid level above which the communication with the venting circuit is closed is the tank maximum fill level.

In the tank according to the invention, the means of communication between the storage volume and the venting volume can be any means. As a preference, the means of communication pass through a sealed partition separating the two volumes. This partition is advantageously at least partially made as a single piece with the parison, for example by "pinching" this parison during moulding. Alternatively or furthermore, this partition may at least in part consist of a part introduced into the parison while the latter is being moulded. This variant is particularly suitable in the case of a two-part parison, as mentioned previously. A part such as this is termed a "partition lead-through" in the context of the invention.

The presence of the sealed partition makes it possible to avoid any significant transfer of liquid between the storage volume and the venting volume, which transfer is liable to cause unwanted closure of the orifice for communication with the venting circuit. Thus, the supply of liquid to the venting tank can come only from a transfer of liquids, for example in the form of droplets, through fuel vapours originating from the storage tank via the communication means.

As a greater preference, the means of communication comprise a ventilation line which extends in the upper part of the storage volume and passes through the sealed partition separating the two volumes.

The sealed partition also makes it possible to avoid premature ingress of liquid into the venting volume during filling. Premature ingress of liquid into the venting volume could actually cause closure of a valve performing the FLVV function, before the various pockets of the reservoir have been filled to their nominal volume.

The aforementioned ventilation line or lines may have any form. As a preference, they have at least a part in the form of a siphon so that the storage volume can be filled as far as possible. As a preference, use will be made of several ventilation lines or siphons so as to ventilate the storage volume whatever the angle of the tank.

The venting volume of the tank according to the invention is preferably an active capacity, that is to say preferably comprises means allowing it to be purged or liquid extracted from it. In the case of a fuel tank for a combustion engine or in the case of a liquid reservoir for a post-treatment system, this purging is preferably performed by a pump. As an especial preference, this pump is actuated by the main feed pump that supplies the engine with fuel or supplies the post-treatment system with liquid. It is preferably a venturi.

One of the requirements that a fuel tank for a motor vehicle combustion engine has to satisfy is that of supplying the engine with fuel even under severe driving conditions, such as climbing a slope, taking a bend with a practically empty tank, etc. Now, in these conditions, the fuel pump needs to be regularly supplied with fuel even if the tank no longer contains anymore than a small amount of fuel.

In order to meet this type of requirement it is known practice to resort to a fuel reserve which serves to collect and retain the fuel to prevent the pump from running dry and ensure that the pump remains prime when the fuel has been exhausted. In the case of the slim fuel tanks mentioned earlier, conventional fuel reserves (or internal volumes generally surrounding the pump/gauge module) are not suitable because the very limited height makes the volume of the bowl very small. Given the small height of the tank, drainage is tricky once the tank has adopted an angle with respect to the horizontal or the fuel level is no longer horizontal as a result, for example, of the accelerations/decelerations that are caused by the movement of the vehicle.

Tanks storing a solution of urea or a diesel additive intended for the regeneration of a particulate filter have also generally to meet this kind of requirement as far as the supply to the exhaust gas post-treatment systems is concerned.

Hence, according to a preferred variant of the invention, the tank comprises:
- a $3^{rd}$ volume or reserve volume, also bounded at least in part by the same wall and into which a tank filling pipe opens;
- a feed pump for supplying the engine with fuel or for supplying the post-treatment system with liquid and which pumps the fuel or the liquid from the reserve volume;
- means of communication between this reserve volume and the storage volume, these means of communication being situated in the upper part of these volumes; and
- pumping means for supplying the reserve volume with fuel or with liquid taken from the storage volume.

This variant makes it possible to guarantee that the reserve volume will always be full at the end of filling (thus allowing the vehicle to be started at the time of the first filling at the factory or after all the fuel supply has been exhausted, and only a minimum remains), and continues to be supplied with fuel thereafter.

In this variant, the feed pump is preferably situated inside the reserve volume. It is also preferably coupled to a filter and/or to a gauge, all these elements preferably being fixed to a base or mounting plate introduced laterally into the volume so as not to impact on the height of the tank. Likewise, connections between the venting line and the canister may be done through this same base, and for the same reason. As an especial preference, all the lines and components are contained in the tank and leave via this lateral base. No line or component therefore takes up any height outside the tank in this variant of the invention.

In this variant of the invention, the gauge present in the reserve volume allows the reserve of fuel to be monitored very accurately (far more accurately than can be achieved by the gauge or gauges present in present-day tanks).

The means of communication between the reserve volume and the storage volume can be any means. When these volumes are adjacent and separated by a field partition, a simple orifice through this partition may do the job. However, when this partition comprises a partition lead-through, it is advantageous for this orifice to be made in the partition lead-through and for it to be equipped with an inclined ramp or any other device which artificially raises the level beyond which the liquid spills over from the reserve volume into the storage volume.

As a preference, the means for pumping the fuel or the liquid from the storage volume to the reserve volume comprise a pump. As an especial preference, as with the pump for purging the venting volume, this pump is primed by the feed pump, and is preferably a venturi.

As an especial preference, in the tank according to this variant of the invention, the main feed pump for supplying fuel or a liquid actuates both:
- a venturi which permanently purges the venting volume by returning the liquid it contains to the storage volume; and
- a venturi filling the reserve volume with fuel or liquid contained in the storage volume.

The volumes of the tank according to the invention may be arranged in any way, for example in series. However, as a preference, the storage volume at least partially surrounds the venting volume. All that is then required is for it to be equipped with several ventilation lines communicating with the venting volume in order to be able to vent and ventilate it more effectively.

Likewise, when the tank comprises a $3^{rd}$ volume (such as a reserve volume as described hereinabove), the latter is also preferably at least partially surrounded by the storage volume and close (in close proximity to) the venting volume. Such a "centralized" architecture does actually make it possible to reduce the length of the aforementioned pumping (venturi) means. It also makes it possible to limit the height and length of the ventilation lines (the communications between the storage volume and the venting volume).

As already mentioned hereinabove, the partitions separating the various volumes are advantageously at least partially made as a single piece with the parison, by "pinching" the parison during moulding. As a preference they also comprise a partition lead-through introduced into the parison while the latter is being moulded. In the case of a "centralized" architecture as described hereinabove, a single partition lead-through may be used, provided that it is arranged in such a way as to be able to form part both of the dividing partition between the reserve volume and the storage volume and of the dividing partition between the storage volume and the venting volume.

In other words, according to a preferred variant, the tank according to the invention comprises a $3^{rd}$ volume bounded by the same wall as the wall common to the other two, this $3^{rd}$ volume also being at least partially surrounded by the storage volume and lies in close proximity to the venting volume, the various volumes being separated by partitions part of which is made as a single piece with the wall and the other part of which belongs to a common partition lead-through.

The concept of the invention (a tank comprising several volumes moulded as a single piece) may be broadened to incorporate other volumes intended, for example (in the case of diesel engines) to store urea and/or diesel additive intended for regenerating a particulate filter.

As explained previously, the present invention is particularly well suited to slim tanks, that is to say to tanks which (preferably at each point) have a small height, typically in the order of a few cm, preferably less than or equal to 15 cm or even 10 cm. Such tanks may, because of their geometry, comprise several joining pads (particularly in the storage volume) because the associated loss in useful volume is small.

The invention also relates to a method for manufacturing a tank as described hereinabove, the said method involving the following steps:
a) a parison is placed in mould cavities equipped with protrusions;
b) the mould cavities are closed in such a way that the protrusions lie close to one another and mould at least part of a dividing partition between two volumes internal to the parison;
c) the mould cavities are opened and the tank is demoulded;
d) the upper part of the dividing partition is equipped with means of communication between the two volumes;
e) at least one orifice is made in the top of the venting volume, the said orifice being able to place the said volume in communication with a venting circuit; and
f) means capable of closing off the said communication when the liquid in the venting volume reaches a predetermined level are fitted.

It must be understood that the steps in this method may be performed in any order.

As a preference, step b) of the method according to the invention allows the tank to be moulded in such a way that the two internal volumes have their respective upper wall and lower wall made as a single piece.

As a preference also, as explained before, the tank is moulded from a 2-part parison and at least one of steps d) to f) is performed while it is being moulded, before the cavities are closed. As an especial preference, in this variant, the means of communication between the volumes are borne by a partition lead-through; the means of closing off the communication with the venting circuit are incorporated into a valve; and the partition lead-through and the valve are fixed to the parison (to the internal surface thereof) using a core insert. Fixing components using a core insert is the subject of application FR 06-01018 in the name of the Applicant Company the subject matter of which is incorporated into the present application by reference. In this variant, the core insert may also serve to incorporate the ventilation lines, the venturis, the gauges and the other aforementioned accessories.

Provided the mould cavities are equipped with the required number of protrusions, this method allows other volumes to be moulded from the same parison, for example a reserve volume and/or one or more additive storage volume(s) for example. When several of these volumes need to communicate with one another it is advantageous to ensure that these volumes are adjacent and communicate via the same partition lead-through.

The partition lead-through(s) incorporated into the parison in this variant of the invention are generally fixed to the parison in line with the protrusions in the mould cavities.

DETAILED DESCRIPTION OF THE INVENTION

Figure 2:
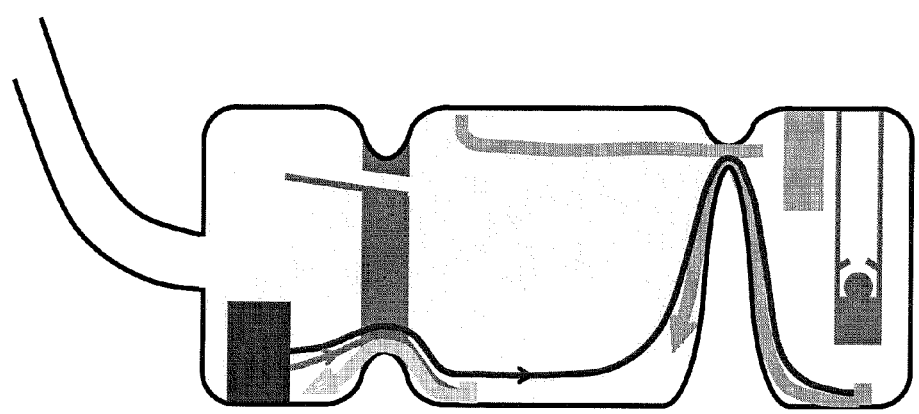
Figure 3:
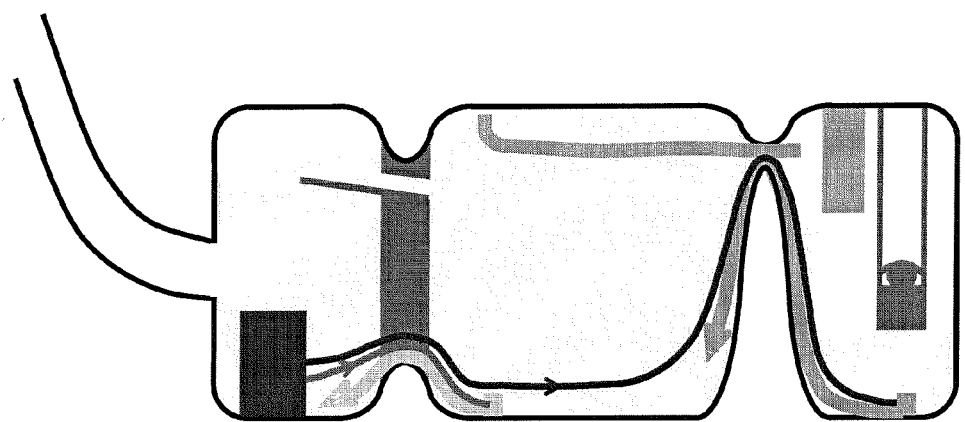

The principle of certain variants of the present invention is illustrated non-limitingly by FIGS. 1 to 3. FIG. 1 illustrates a fuel tank according to the invention, empty; FIG. 2 illustrates the same tank while it is in the process of being filled, and FIG. 3 illustrates the same tank filled to its maximum level.

FIG. 1 identifies the various constituent parts of the tank, namely:
1. storage volume
2. reserve volume
3. venting volume
4. filling pipe
5. pump
6. partition lead-through
7. inclined ramp of the partition lead-through
8. ventilation line
9. ROV
10. FLVV
11. venturi for filling the reserve volume
12. venturi for purging the venting volume.

The subsequent figures illustrate the principal of operation thereof and, in particular, the functions of:
Filling:
Filling is done via the filling pipe (4) which leads directly into the reserve volume (2). The latter is therefore always filled practically to the maximum at the end of filling (see FIG. 3), which allows the vehicle to be started at the time of first filling at the factory or after the fuel supplies have been exhausted and only a minimum remains.

When the reserve volume (2) is full to maximum of its capacity (given the location and the geometry of the inclined ramp (7) of the partition lead-through (6)), the storage volume (1) becomes filled in its turn via the inclined ramp (7) of the partition lead-though (6).

When the storage volume (1) is full, the fuel reaches the venting volume (3) via the ventilation line (8). As soon as the fuel level in the venting capacity (3) rises, the FLVV (10) closes.

The fuel that has built up in the venting volume (3) will be emptied out by the venturi (12) as soon as the vehicle is started. It is therefore an active venting capacity.

Pumping:

As soon as the pump (5) is started (generally as soon as the engine is started), the venturi (12), permanently empties the venting volume (3) into the storage volume (1). Another venturi (11) permanently pumps fuel from the storage volume (1) into the reserve volume (2) so that the latter is always full to its maximum capacity (see before).

Ventilation:

In the volume (3), venting and deventilation occur via the ROV (9) and FLVV (10) valves, which are values which are generally open and do not close until the maximum fill level is reached (in the case of the FLVV (9)) and/or until the tank is at an angle, has rolled over, or is experiencing waves (in the case of the ROV (8) and the FLVV (9)). Each valve is connected to the outside of the tank by an internal line, not depicted, opening onto one side of the tank through a base. The storage volume (1) is ventilated via the ventilation line (8) which has a shape that allows the storage volume (1) to be filled practically to 100% of its capacity.

The invention claimed is:

1. A liquid tank comprising:
    a storage volume to store liquid, defined at least in part by a wall;
    a venting volume to vent the tank, defined at least in part by the wall;
    means for communicating between the storage and venting volumes, situated in a top of said storage and venting volumes;
    at least one orifice situated in the top of the venting volume, normally placing said venting volume in communication with a venting circuit;
    means for closing off said communication, when the liquid in the venting volume reaches a predetermined level;
    a reserve volume, defined at least in part by the wall and into which a tank filling pipe opens;
    a feed pump to supply an engine with fuel or for supplying a post-treatment system with the liquid and which pumps the fuel or the liquid from the reserve volume;
    means for communicating between the reserve volume and the storage volume, the means for communicating being situated in an upper part of the reserve and storage volumes; and
    pumping means for supplying the reserve volume with the fuel or with the liquid taken from the storage volume.

2. The liquid tank according to claim 1, wherein the storage and venting volumes have their respective top wall and bottom wall made as a single piece.

3. The liquid tank according to claim 1, wherein the means for communicating between the storage volume and the venting volume comprises a ventilation line which extends in the upper part of the storage volume and passes through a sealed partition separating the two volumes.

4. The liquid tank according to claim 1, said tank being a fuel tank for a combustion engine or a storage tank for storing a liquid of a urea solution or a diesel additive type for an exhaust gas post-treatment system.

5. The liquid tank according to claim 4, wherein the venting volume comprises a Venturi actuated by the feed pump.

6. The liquid tank according to claim 1, wherein the feed pump is situated inside the reserve volume, and is coupled to a filter, a gauge, or both, and wherein all of these elements are fixed to a base or mounting plate introduced laterally into the reserve volume.

7. The liquid tank according to claim 1, wherein the means for pumping the fuel or the liquid from the storage volume into the reserve volume comprises a Venturi operated by the feed pump.

8. The liquid tank according to claim 1, wherein the storage volume at least partially surrounds the venting volume and comprises several ventilation lines communicating with the venting volume.

9. The liquid tank according to claim 8, wherein said reserve volume is also partially surrounded by the storage volume and lies in close proximity to the venting volume, the various volumes being separated by partitions, part of which is made as a single piece with the wall and the other part of which belongs to a common partition lead-through.

10. A method for manufacturing a tank according to claim 1, said method involving the following steps:
    a) a parison is placed in mould cavities equipped with protrusions;
    b) the mould cavities are closed in such a way that the protrusions lie close to one another and mould at least part of a dividing partition between two storage and venting volumes internal to the parison;
    c) the mould cavities are opened and the tank is demoulded;
    d) the upper part of the dividing partition is equipped with the means for communicating between the two storage and venting volumes;
    e) the at least one orifice is made in the top of the venting volume, said orifice being able to place said venting volume in communication with a venting circuit; and
    f) the means for closing off said communication, when the liquid in the venting volume reaches a predetermined level, are fitted.

11. The method according to claim 10, wherein the parison is in two parts, and wherein at least one of steps d) to f) takes place before the mould cavities are closed.

12. The method according to claim 11, wherein the means for communicating between the volumes are borne by a partition lead-through; wherein the means for closing off the communication with the venting circuit are incorporated into a valve; and wherein the partition lead-through and the valve are fixed to the parison using a core insert.

13. A liquid tank comprising:
    a storage volume to store liquid, defined at least in part by a wall;
    a venting volume to vent the tank, defined at least in part by the wall;
    a pass-through that communicates between the storage and venting volumes, situated in a top of said storage and venting volumes;
    at least one orifice situated in the top of the venting volume, normally placing said venting volume in communication with a venting circuit;
    a valve that closes off said communication, when the liquid in the venting volume reaches a predetermined level;
    a reserve volume, defined at least in part by the wall and into which a tank filling pipe opens;
    a feed pump the to supply an engine with fuel or for supplying a post-treatment system with the liquid and which pumps the fuel or the liquid from the reserve volume;
    a partition lead-through that communicates between the reserve volume and the storage volume, the partition lead-through being situated in an upper part of the reserve and storage volumes; and
    a pump that supplies the reserve volume with the fuel or with the liquid taken from the storage volume.

14. The liquid tank according to claim 13, wherein the liquid tank is molded from a parison and a top wall of each of the storage volume, the venting volume, and the reserve volume is formed from a first part of the parison.

15. The liquid tank according to claim 14, wherein a bottom wall of each of the storage volume, the venting volume, and the reserve volume is formed from a second part of the parison.

16. The liquid tank according to claim 1, wherein the liquid tank is molded from a parison and a top wall of each of the storage volume, the venting volume, and the reserve volume is formed from a first part of the parison.

17. The liquid tank according to claim 16, wherein a bottom wall of each of the storage volume, the venting volume, and the reserve volume is formed from a second part of the parison.

* * * * *